April 15, 1924.  1,490,758

J. H. BENSON

HITCH ATTACHMENT

Filed March 13, 1922    2 Sheets-Sheet 2

INVENTOR.
J. H. BENSON
BY White Frost Frame
his ATTORNEYS.

Patented Apr. 15, 1924.

1,490,758

UNITED STATES PATENT OFFICE.

JOHN H. BENSON, OF OAKLAND, CALIFORNIA, ASSIGNOR OF ONE-HALF TO THOMAS E. McENEANY, OF BERKELEY, CALIFORNIA.

HITCH ATTACHMENT.

Application filed March 13, 1922. Serial No. 543,402.

*To all whom it may concern:*

Be it known that I, JOHN H. BENSON, a citizen of the United States, and a resident of Oakland, county of Alameda, State of California, have invented a new and useful Hitch Attachment, of which the following is a specification.

A popular form of tractor is provided with a pair of front steering wheels, or a front steering wheel, and a pair of circular rear traction wheels the latter being mounted on a rear transverse driving shaft and axle passing through a housing body in which is arranged a unitary power plant and transmitting mechanism. This housing body is provided at its rear end, usually with a rearwardly extending draft casting to which is adapted to be connected the drawn vehicle. When the vehicle is so connected to the draft hitch casting, it tends to lessen the tractive efficiency of the front steering wheels or wheel, thus permitting these wheels or wheel to skid when making turns and therefore materially interfering with the most efficient operation of the vehicle.

Broadly, an object of my present invention is to provide means for so connecting the drawn vehicle to the tractor that a portion of the drawn load is transmitted in a downward pressure to the front wheels, thus materially increasing their tractive efficiency and improving maneuvering action.

More particularly an object is to provide for the attachment of the drawn load to the tractor so that the center of pull is at a point somewhat forward of the center of the driving axle and preferably somewhat below the axis of the axle. In this connection it is an object to provide for the connection of the draft attachment at a point which is slightly forward of the axis of the axle so as to permit turning of the tractor from right to left without skidding of front wheels when under load.

Another object is to provide an improved hitch enabling the adjustment of a draft link to positions to secure the best operating efficiency as for orchard and hillside work.

A further object is to enable the operator to readily change his position from time to time for the better manipulation of the parts of the tractor and, if desired, a drawn instrument or vehicle and in this connection it is an object to provide a platform arranged for the convenience of the operator to reach in a standing position various adjustable parts and equipment of the vehicle while it is in motion.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Figure 1:
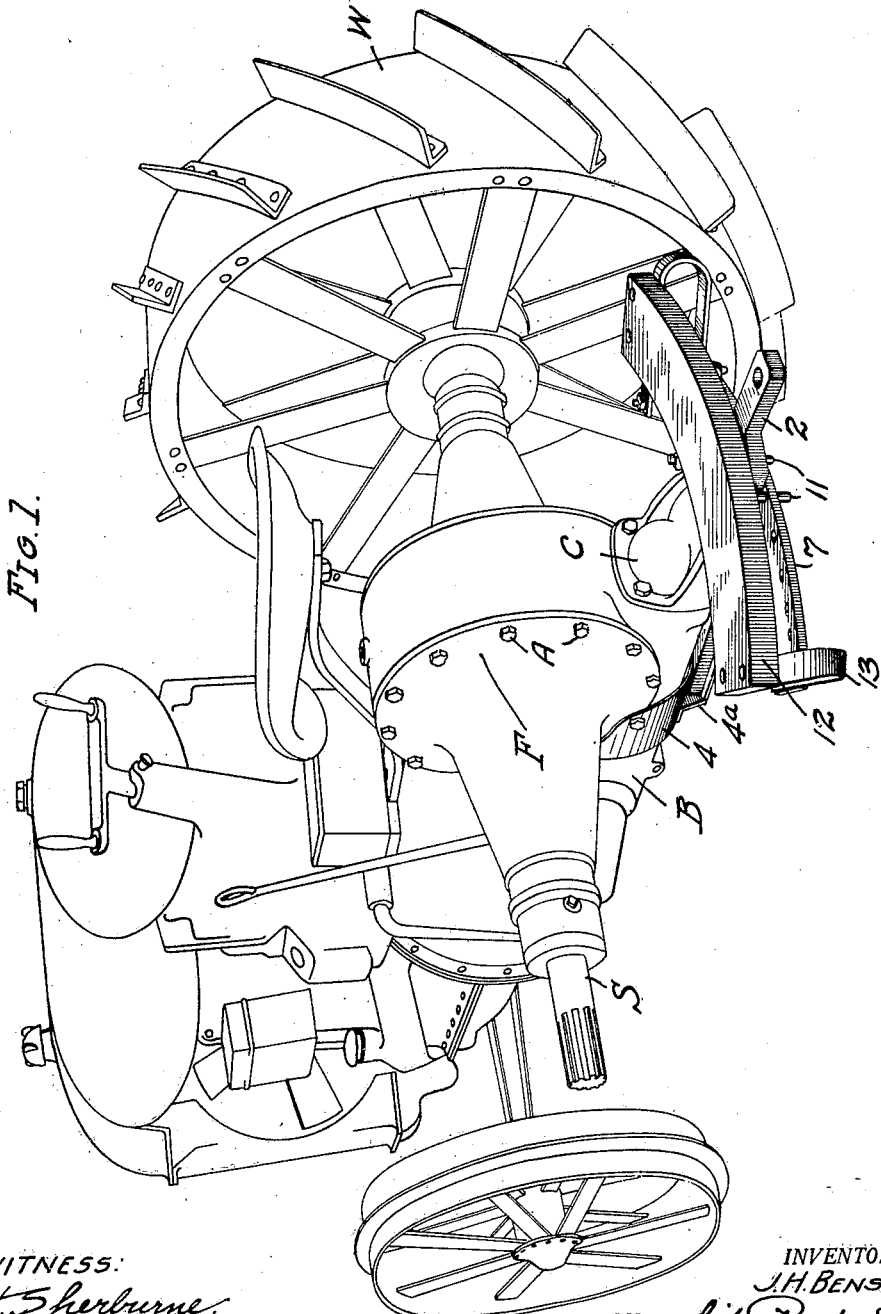
Fig. 1 is a perspective looking toward the rear of the housing-body and being provided with my improved hitch.
Figure 2:
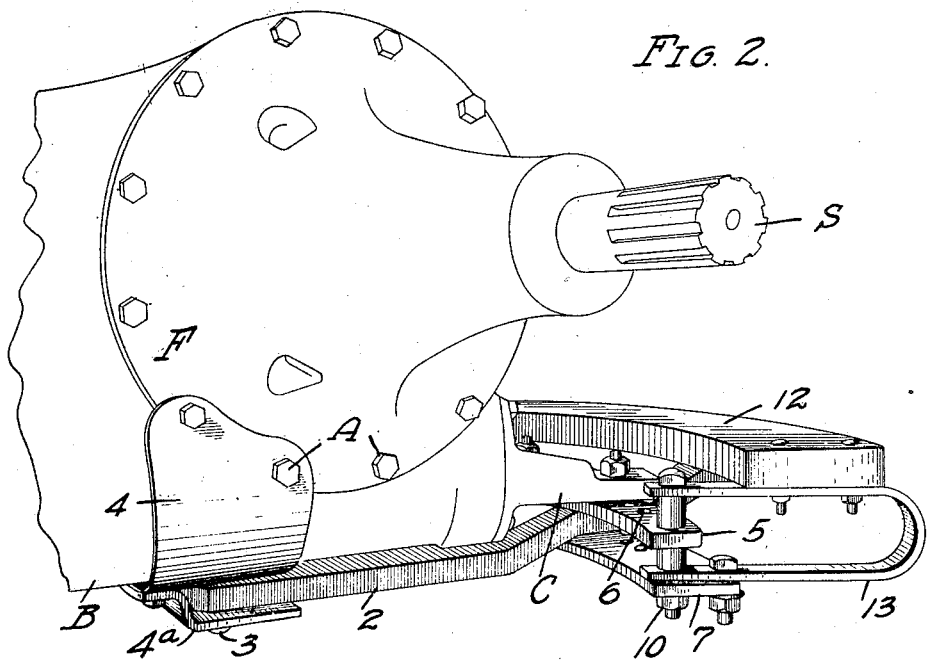
Fig. 2 is a perspective showing a portion of the tractor power unit housing-body with which my invention is combined.

The device of my present invention is herein shown as in the form of an attachment applicable to a tractor, but it is to be understood that the invention can be combined in the original tractor structure. Broadly, the invention consists of a pivot means or pin which I place somewhat forward of and below the axis of the rear driving shaft or axle of the tractor and connecting to the said pin is a draft link designed to oscillate laterally and by which the resistance offered by the drawn vehicle or instrument, such as a plow, is transferred to the tractor body in such a manner as to apply a downward pressure upon the front axle and its wheels. Means are also included for supporting and guiding the swinging end of the draft link and, when so desired, for locking the draft link at any desirable position to either side of the longitudinal center of the power plant according to the work and conditions of operation.

More specifically my invention consists of a draft link 2 of suitable length and the rear end of which may be and preferably is provided with one or more lateral offsets to bring the trailing end to a desired elevation behind a body structure B, which in the present case is in the form of a housing enclosing the driving and transmitting mechanism of the tractor and through which housing extends the driving shaft S carrying the rear traction wheels W. From the rear of the housing body of the type of tractor herein shown there extends a bracket C forming usually the hitch connection to which the drawn vehicle or instrument is attached.

By my invention, instead of connection being made to the draft casting C, the hitch link 2 extends forwardly under the housing body B and is mounted upon a substantial pivot forming element as a pin 3 preferably disposed on a vertical axis somewhat in front of the axis of the driving shaft S. In new construction the pivot pin 3 may be incorporated directly in the organization, as by being mounted in or formed upon the bottom of the housing B, but in tractors already in use and constructed ready for use, the attachment can be effectively completed without changing the standard construction in any wise, as by the following means. The pivot pin 3 is secured in what may be termed a chair indicated at 4, in the form of a segment of a cylinder adapted to pass around under the bottom of the body B and extend upwardly along the same on each side to overlap the flanges F of hubs of the housing and through which extends the shaft S. The flanges are respectively secured by bolts A extending therethrough into the housing. The upwardly extending ends of the chair 4 are perforated to receive certain of the bolts A, so that the chair may be secured in position by the usual bolts without in any wise changing the standard construction of the parts. To strengthen the pin, if desired, there may be extended down a bracket 4a through which the lower end of the pin passes. By connecting the hitch to the rear axle housing of a tractor having the driving power exerted from the rear wheels, while the steering of the tractor is performed by the front wheels, the pressure of the front wheels on the ground is maintained within certain limits, so that for variations in draw bar pull, the pressure on the front wheels is always sufficient to prevent skidding of the front wheels but does not increase to such magnitude as to seriously increase the labor of steering the vehicle.

Figure 3:
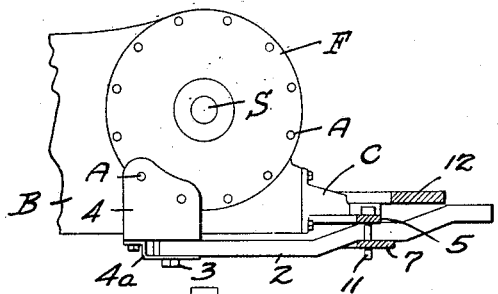
Fig. 3 is a side elevation and partial, sectional view.
Figure 4:
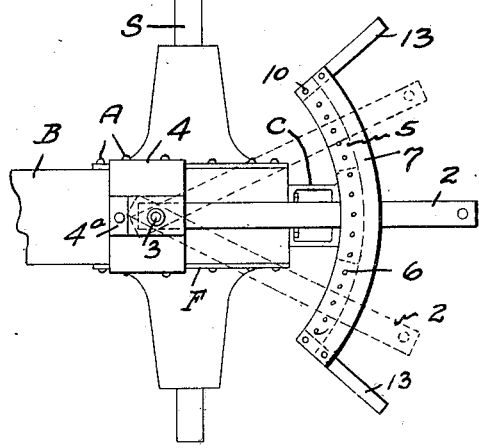
Fig. 4 is a plan view omitting the platform.

To support the rear and swinging end of the draft link 2 there is suitably secured to the draft bracket or casting C a flat curved bar or plate 5 which is perforated along its length, as at 6, Fig. 5; the bar 5 being bolted up against the bottom of the bracket C. Arranged below the bar 5 is a substantial guide plate 7 above which the rear end of the draft link 2 swings and on which it is supported. The plate 7 is secured as by means of bolts 10 passing through the ends of the plate and up into the curved bar 5 and also spacing the bar and plate vertically. The lower plate is perforated with apertures registering with the aperture 6 in the plate 5 and for the purpose of preventing lateral swinging of the draft link 2 there may be passed through the spaced bar and plate stopping means in the form of pins 11, as shown in Fig. 3. This is desirable in cases in which the tractor is being used as for plowing in orchard or side hill work and when it is desired to throw the drawn instrument or vehicle to one side of the longitudinal center of the tractor.

A further feature of the invention is the provision of means enabling the operator of the tractor to change his position from time to time, as may be necessary for convenient manipulation of the tools, equipment and operating elements of the machine. Such a means is shown as comprising a platform in the form of an arcuate flat plank 12, shown as secured at its ends to U-shaped brackets 13 which are secured to the bolts 10 at the ends of the bar and plate, above mentioned. In this position the platform extends around the rear end of the housing body and provides a comfortable standing station for the operator. The platform is arranged just above the end of the draft link 2 so that the latter can operate freely when it is not restrained by the adjustable pins 11.

I claim:

1. The combination with a tractor having a rear driving axle housing and front steering wheels, of a draft link pivoted to the housing at its under side and extending backwardly below said housing, whereby the pressure of the front wheels on the ground is maintained within operative limits for variations in draft link pull.

2. The combination with a tractor having a rear driving axle and front steering wheels, of a draft link connected to the tractor below, in front of and adjacent to the rear driving axle, whereby the pressure of the front wheels on the ground is maintained within operative limits for variations in draft link pull.

In testimony whereof, I have hereunto set my hand.

JOHN H. BENSON.